United States Patent [19]

Hunter et al.

[11] 4,043,204
[45] Aug. 23, 1977

[54] MAGNETIC FLUID BEARING ACCELEROMETER

[75] Inventors: Joe S. Hunter; Little J. Little, both of Huntsville, Ala.

[73] Assignee: The United States of America as represented by the Secretary of the Army, Washington, D.C.

[21] Appl. No.: 714,881

[22] Filed: Aug. 16, 1976

[51] Int. Cl.$^2$ .............................................. G01P 15/08
[52] U.S. Cl. .................................. 73/516 R; 73/517 B
[58] Field of Search .................... 73/516 R, 517 B; 308/10

[56] References Cited

U.S. PATENT DOCUMENTS

| | | | |
|---|---|---|---|
| 3,339,419 | 9/1967 | Wilcox | 73/517 B |
| 3,530,727 | 9/1970 | Albert | 73/516 R |
| 3,734,578 | 5/1973 | Rosensweig | 308/10 |

Primary Examiner—James J. Gill
Attorney, Agent, or Firm—Nathan Edelberg; Robert P. Gibson; Harold W. Hilton

[57] ABSTRACT

An accelerometer employing a magnetic fluid bearing which permits movement of a magnetic cylinder along a designated sensitive axis. The device is used to measure acceleration in such applications as inertial platform leveling, thrust termination, and inertial reference triads. The position of the magnetic cylinder (proof mass) is measured by a capacitance bridge network. The output of this capacitance network is a voltage which is proportional in direction and magnitude to the applied acceleration. This voltage will be amplified by an operational amplifier.

3 Claims, 1 Drawing Figure

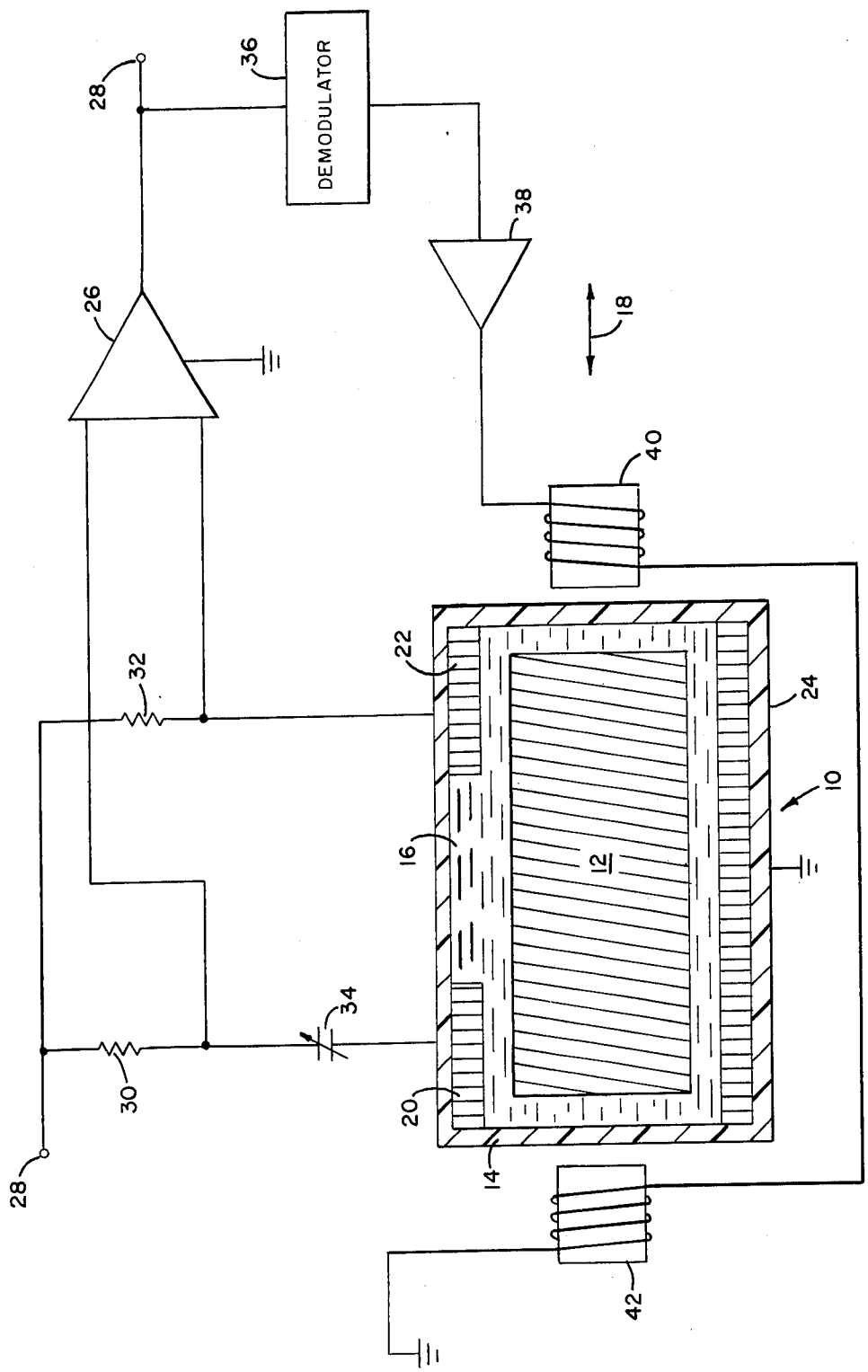

MAGNETIC FLUID BEARING ACCELEROMETER

DEDICATORY CLAUSE

The invention described herein may be manufactured, used, and licensed by or for the Government for governmental purposes without the payment to us of any royalities thereon.

BACKGROUND OF THE INVENTION

Most conventional accelerometers employ a pendulous system suspended by either a flexure or hinged pivot. The pendulum is free to deflect in one axis but is rigidly supported in the other two. The spring restraint of the pivots is kept small and the accelerometer is operated in a tightly closed loop. Normally the conventional accelerometer utilizes flex leads to transmit current through the torquer coil. These flexure hinges and flex leads introduce a certain amount of error in the form of bias and rectification torque. The present invention overcomes this handicap by operating without the aid of flexure hinges or flex leads.

SUMMARY OF THE INVENTION

The apparatus of the present invention is a device for measuring acceleration. The device is made up of a permanent magnetic cylinder encompassed by a nonmetallic housing. A thin layer of magnetic fluid which will adhere to the magnetic cylinder acts as a bearing and permits movement of the cylinder along the sensitive axis. The position of the magnetic cylinder within the housing is measured by a capacitance bridge. The output from the capacitance bridge, which is amplified by a differential amplifier, is an analog representation of the applied acceleration in both direction and magnitude. The output from the differential amplifier is demodulated and amplified and used as a feedback to energize electromagnets which provide closed loop operation of the instrument by aiding or opposing the magnetic field associated with the permanent magnetic cylinder proof mass.

BRIEF DESCRIPTION OF THE DRAWING

The single FIGURE shows the sensing device and electronics associated with the magnetic fluid bearing accelerometer.

DESCRIPTION OF THE PREFERRED EMBODIMENT

Referring now to the single Figure, a magnetic fluid bearing accelerometer and associated electronics is illustrated. The accelerometer 10 includes a solid permanent magnetic cylinder 12 encompassed by a nonmetallic housing 14 having a cylindrical interior. A thin layer of magnetic fluid 16 which will adhere to the magnetic cylinder 12 acts as a bearing and permits movement of the cylinder 12 along the sensitive axis 18. The position of the magnetic cylinder 12 within the housing 14 is measured by a capacitance bridge 20, 22, and 24. The bridge includes plate 20 which is in the interior of housing 14 and on a first side of magnetic cylinder 12 adjacent one end of housing 14. A second plate 22 is spaced from plate 20 adjacent a second end of the cylindrical housing 14 and on the same side of magnetic cylinder 12 as is plate 20. The third, or common plate 24, is disposed in the interior of the housing substantially along the length of the housing and is grounded. Plate 24 is on a side of cylinder 12 which is opposite to plates 20 and 22. The output from the capacitance bridge 20, 22, and, 24 which is amplified by a differential amplifier 26, is an analog representation of the applied acceleration in both magnitude and direction. An AC excitation 28 is applied to the capacitance bridge through a pair of load resistors 30 and 32. A variable capacitor 34 is provided to adjust out any null bias. An acceleration along the sensitive axis 18 varies the capacitance coupling between capacitance pairs 20, 22, and, 24 and unbalances the inputs to the differential amplifier. The output of the differential amplifier 26 is proportional to the applied acceleration in magnitude and direction. The output from the differential amplifier 26 is demodulated at demodulator 36 and amplified in amplifier 38 and used as a feedback to energize electromagnets 40 and 42 which provide closed loop operation of the instrument by aiding or opposing the magnetic field associated with the permanent magnet cylinder 12 proof mass. Some advantages of this invention are that it eliminates the requirements for flex leads to moving system and it eliminates friction between the case and the moving system. Null stiction is virtually nonexistent. The differential mechanization of the pickoff allows the accelerometer to operate over a wide range of temperatures without suffering appreciable degradation of performance. The concept can be mechanized for either open or closed loop operation.

We claim:
1. A fluid accelerometer including:
   a. a non-magnetic housing having a cylindrical interior;
   b. A magnetic cylinder carried in said housing;
   c. a magnetic fluid carried in said housing about said magnetic cylinder;
   d. a capacitance bridge means cooperating with said magnetic cylinder for providing a voltage which is proportional in direction and magnitude to applied acceleration said bridge means including a first plate in the interior of said housing adjacent a first end thereof, a second plate in the interior of said housing adjacent a second end thereof, said first and second plates being disposed on one side of said magnetic cylinder, a common plate disposed in the interior of said housing substantially along the length thereof and on a second side of said magnetic cylinder which is opposite said first side; and,
   e. means for providing closed loop operation of said accelerometer by aiding or opposing the magnetic field associated with the magnetic cylinder.

2. An accelerometer as set forth in claim 1 wherein said means for providing closed loop operation includes a pair of electromagnets, each disposed adjacent opposite ends of said housing, a differential amplifier connected to said capacitance bridge and said electromagnets whereby the output of said differential amplifier is used as a feedback to energize said electromagnets to provide the closed loop operation.

3. A fluid amplifier as in claim 2 including a demodulator for demodulating the output of said differential amplifier and an amplifier for amplifying the output of said demodulator.

* * * * *